US007175794B2

(12) United States Patent
Koch et al.

(10) Patent No.: US 7,175,794 B2

(45) Date of Patent: Feb. 13, 2007

(54) METHOD FOR MANUFACTURING A PRESSED PART FROM A SOFT MAGNETIC COMPOSITE MATERIAL

(75) Inventors: Hans-Peter Koch, Stuttgart (DE); Jochen Winkler, Esslingen (DE); Andreas Harzer, Schwieberdingen (DE); Wolfgang Ballerstedt, Schoenebeck (DE); Torsten Bober, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 257 days.

(21) Appl. No.: 10/074,175

(22) Filed: Feb. 11, 2002

(65) Prior Publication Data

US 2002/0135089 A1 Sep. 26, 2002

(30) Foreign Application Priority Data

Feb. 10, 2001 (DE) ................................ 101 06 172

(51) Int. Cl.
*B29C 45/72* (2006.01)

(52) U.S. Cl. ...................... 264/235; 264/294; 264/319; 264/346

(58) Field of Classification Search ................ 264/101, 264/235, 294, 319, 346
See application file for complete search history.

(56) References Cited

U.S. PATENT DOCUMENTS

| | | | | |
|---|---|---|---|---|
| 5,047,391 | A * | 9/1991 | Bock et al. | 505/450 |
| 5,122,255 | A * | 6/1992 | Noda et al. | 204/425 |
| 5,268,140 | A * | 12/1993 | Rutz et al. | 75/246 |
| 5,506,199 | A * | 4/1996 | Bock et al. | 505/450 |
| 5,754,936 | A * | 5/1998 | Jansson | 419/10 |
| 6,001,272 | A * | 12/1999 | Ikuma et al. | 252/62.54 |
| 6,174,453 | B1 * | 1/2001 | Harada | 252/62.54 |
| 6,383,281 | B2 * | 5/2002 | Bayer | 106/272 |
| 6,537,389 | B1 * | 3/2003 | Aichele et al. | 148/307 |
| 6,620,376 | B1 * | 9/2003 | Koch et al. | 419/64 |

FOREIGN PATENT DOCUMENTS

| | | |
|---|---|---|
| EP | 0 765 199 | 4/1997 |
| WO | WO 95/33589 | 12/1995 |

* cited by examiner

*Primary Examiner*—Christina Johnson
*Assistant Examiner*—Monica A Huson
(74) *Attorney, Agent, or Firm*—Kenyon & Kenyon LLP

(57) ABSTRACT

A method for manufacturing a pressed part from a soft magnetic composite material. A starting mixture is provided that includes an iron powder and an auxiliary pressing agent. The starting mixture is pressed to form a pressed part and annealed at temperatures between 380° C. and 450° C. in a mixture of an inert gas and oxygen that has an oxygen concentration between 1% and 10% by volume. A second embodiment of a method for manufacturing a pressed part from a soft magnetic composite material in which a starting mixture is provided that includes an iron powder and an auxiliary pressing agent. The starting mixture is pressed to form a pressed part, annealed, and then postformed and re-annealed.

5 Claims, No Drawings

METHOD FOR MANUFACTURING A PRESSED PART FROM A SOFT MAGNETIC COMPOSITE MATERIAL

FIELD OF THE INVENTION

The present invention relates to a method for manufacturing a pressed part from a soft magnetic material which can be used as a magnet core for a common-rail injector.

BACKGROUND INFORMATION

Iron powders mixed with a thermoplastic resin are particularly suitable for manufacturing magnet cores, as is described in European Patent No. 0 765 199. In particular, this publication provides for an iron powder being initially treated with phosphoric acid and then mixed with a thermoplastic resin. This mixture is pressed at a temperature less than the glass-transition temperature or the melting point of the thermoplastic resin, and the pressed product is heated to cure the thermoplastic resin. The resulting components can then be annealed at a temperature greater than the curing temperature of the thermoplastic resin.

In addition, the publication describes the addition of polyetherimide and oligomers to the thermoplastic material. The polyetherimide is known under the trade name Ultem®, and the oligomers, which are described in PCT International Patent Application No. WO 95/33589 and marketed by Elf Atochem, France, are known under the trade name Orgasol 3501 and Orgasol 2001.

Furthermore, European Patent No. 0 765 199 provides for the iron powder being mixed with an auxiliary pressing agent or a lubricant, which can be a metal stearate, a wax, a paraffin, a natural or synthetic fat derivative, or an amide-type oligomer (oligoamide). The products Kenolube® from the company Höganäs AB, Sweden, H-wax® from the company Höchst AG, Germany, and Promold® from the company Morton International, Cincinnati, USA, are specifically described as lubricants or auxiliary pressing agents, which can be mixed with the iron powder at a weight percentage of 0.2 to 0.8.

Additionally, European Patent No. 0 765 199 describes pressing this starting mixture at a pressure of 400 to 1800 MPa, and subsequently annealing it in air at temperatures between 100° C. and 600° C., particularly 200° C. to 500° C.

A powdery, soft magnetic material manufactured according to European Patent No. 0 765 199 is marketed by the company Höganäs AB, Sweden under the trade name Somaloy™ 500 and is characterized in detail in the company newspaper SOMALOY™500, SMC 97–1, pages 1–11, Höganäs AB, Sweden.

In addition, such soft magnetic composites are also described in "Weichmagnetische Verbundwerkstoffe für Elektromotoren" ("Soft Magnetic Composite Materials for Electric Motors"), Jan Tengzelius, Hagener Symposium volume of minutes, Dec. 1, 2000, pages 211 to 227.

The object of the present invention is to provide a method for manufacturing a pressed part from a powder mixture that includes an iron powder that is specially used as a magnet core for common-rail injectors and has mechanical and magnetic properties that are improved in comparison with the related art.

SUMMARY OF THE INVENTION

In comparison with the related art, the methods of the present invention have the advantage that the pressed parts, i.e. magnet cores for common-rail injectors, which are manufactured in accordance with the method, are superior to conventional magnet cores made of soft magnetic composites manufactured from, e.g. mixtures of pure iron powder with polyamide binder, pure iron powder with polyphenylene sulfide binder, or pure iron powder with polyethylene binder, particularly with regard to mechanical strength, density, saturation polarization, magnetic permeability, specific electrical resistance, surface hardness, and bending strength.

For example, in comparison with magnet cores made of polyphenylene-sulfide-bonded composite material, the pressed magnet cores manufactured according to the present invention have a density greater than 7.3 g/cm$^3$, which is increased by at least 0.2 g/cm$^3$, and they have a markedly improved surface hardness and statistical bending strength, which especially manifests itself in the critical region of the pole faces as improved edge breaking resistance under permanent load. In addition, there is less of a tendency for material to break off of the magnet cores, allowing less diesel fuel to penetrate the structure of the workpiece. In addition, the pressed magnet cores manufactured according to the present invention typically exert a magnetic force of 95 N to 103 N, while corresponding pressed parts made of polyphenylene-sulfide-bonded composite only reach approximately 80 N.

When,used as a magnet core in common-rail injectors, the pressed parts manufactured according to the present invention also have, in comparison with conventional magnet cores, a markedly higher dynamic switching response, in particular a make-time reduced by ca. 20 μs, a reduced power demand, a mechanical strength increased by approximately 50%, a better machining capability, and less sensitivity to processing tolerances during manufacture.

In addition, the use of a cheaper raw material and the elimination of the previously required hot-pressing allows them to be manufactured less expensively, and also reduces the amount of tool wear.

A certain minimum amount of oxygen in the gaseous atmosphere has proved to be advantageous during annealing, especially in combination with temperatures between 380° C. and 450° C., in order to ensure sufficient oxide formation between the iron-powder particles on their surfaces. On the other hand, the amount of oxygen in the utilized gas atmosphere is markedly reduced in comparison with the related art, resulting in clearly improved magnetic properties of the pressed parts, for example, a higher magnetic force.

It is particularly advantageous for the gaseous atmosphere during annealing to be a gas mixture having an oxygen concentration of 2% to 7% by volume, a mixture of air and nitrogen or a mixture of air and a noble gas being producible in a simple and cost-effective manner, where the concentration of the air is between 10% and 40% by volume, and in particular, 10% to 30% by volume.

In addition, it is advantageous when, subsequent to annealing the pressed parts in the form of magnet cores, they are subject to mechanical processing, e.g. careful grinding, which removes the differences in the pole heights and evens out the pole surfaces, and may further increase the magnetic force of the pressed parts used, e.g. as magnet cores, to greater than 100 N.

A further improvement in the magnetic and mechanical properties of the pressed parts, in particular with regard to their density, is achieved when the pressed parts are annealed in a two-step method. After the starting mixture is pressed, the pressed part initially being annealed at a relatively low temperature, it is subsequently pressed again in a die plate or using planar hot-forming, and is then annealed again at a higher temperature.

Since the pressed parts that are manufactured according to the method of the present invention are made of soft magnetic composite material such as an oxide-bonded material, i.e. a metal stearate added, for example, to the starting mixture decomposes to a metal oxide during the annealing process, structural cohesion is improved by the presence of oxide at the grain boundaries which causes formation of iron-oxide bridges. Therefore, the pressed parts manufactured according to the present invention also contain little or no more organic components compared to pressed parts made of polymer-bonded, soft magnetic composites. In addition to their high density, the pressed parts manufactured according to the present invention therefore have a lower porosity as well, which markedly improves the long-term thermomechanical resistance, particularly to hot diesel fuel.

DETAILED DESCRIPTION

A first exemplary embodiment of the present invention starts out from a starting mixture having a pure iron powder and an auxiliary pressing agent. Such a starting mixture is marketed by the company Höganäs, Sweden, under the trade name Somaloy™ 500.

In particular, the pure iron powder used here is a high-purity iron powder which has a phosphatized surface. As described in European Patent No. 0 765 199, an auxiliary pressing agent selected from the group of metal stearates, waxes, paraffins, natural or synthetic fat derivatives, or oligoamides, is added to the iron powder as a lubricant.

The pure iron powder can be used together with the auxiliary pressing agent of the company Höganäs AB, Sweden, which is known by the trade name of Kenolube®. To this end, the auxiliary pressing agent Kenolube®, which essentially includes an amide wax and zinc stearate, is added to the pure iron powder at a weight percent of 0.4 to 0.7, for example, 0.5 to 0.6, and mixed with it to form the starting mixture. The starting mixture is then pressed in a normal die tool at room temperature, for example, and at a pressure of 600 MPa to 900 MPa, in particular 700 MPa to 800 MPa, into the form of, e.g. a magnet core for common-rail injectors.

After the pressing procedure, the resulting pressed part is annealed at temperatures of 380° C. to 450° C., in particular, approximately 425° C., for a period of time of 10 min to 120 min, for example, 30 min to 60 min, in a nitrogen-air mixture or a noble-gas-air mixture. The concentration of air is maintained between 5% and 50% by volume, in particular 10% to 30% by volume, e.g. 20% by volume. In this context, the auxiliary pressing agent is partially decomposed and partially converted to a bonding oxide. As an alternative, a mixture of an inert gas and oxygen, e.g. a nitrogen-oxygen mixture or an argon-oxygen mixture, can also be used, which has an oxygen concentration between 1% and 10% by volume, in particular 2% to 7% by volume.

The pressed parts obtained after the annealing procedure cab be subjected to a final mechanical surface treatment, e.g. grinding. This improves the mechanical properties and the long-term stability of the obtained, pressed parts. In addition, the subsequent grinding increases the magnetic force measured at such magnet cores by approximately 5% to 10%, in general.

A second exemplary embodiment of the present invention deviates from the above-described exemplary embodiment in that, after pressing the starting mixture to form the pressed part, a first temperature step is initially undertaken at a temperature of 150° C. to 400° C., in particular at temperatures between 230° C. and 310° C.

This first temperature step can be taken in air or an inert-gas atmosphere, such as a noble-gas atmosphere or a nitrogen atmosphere. However, it can also be executed analogously to the annealing in the first exemplary embodiment, in a mixture of an inert gas and oxygen, the concentration of oxygen in the gas mixture being between 1% and 10 by volume.

In this exemplary embodiment, the gas atmosphere is ideally a mixture of air and nitrogen, once again, the concentration of air being between 5% and 50% by volume, in particular 10% to 30% by volume, and, as an example, 20% by volume.

After the first temperature step, the annealed, pressed part is pressed again at a pressure of 600 MPa to 900 MPa, in particular 700 MPa to 800 MPa, at room temperature, in order to postform it.

This postforming step can alternatively be carried out, using flat hot-forming, in a suitable die tool, at increased temperatures, as is described by way of example in German Published Patent Application No. 100 05 551.6.

After the described postforming, the pressed part is annealed again for a second time, in a manner analogous to the first exemplary embodiment, at temperatures of 380° C. to 450° C., in particular 425° C., for a period of time of 10 min to 120 min, especially 30 min to 60 min, in a nitrogen-air mixture or a noble-gas-air mixture. The concentration of air is maintained between 5% and 50% by volume, in particular 10% to 30% by volume, and, as an example, 20% by volume.

The pressed parts obtained after the annealing procedure can be subjected to a final mechanical surface treatment, e.g. grinding, in a manner analogous to the first exemplary embodiment.

In particular, a pressed part according to the above-mentioned exemplary embodiments, which is made of a soft magnetic composite material that includes the phosphatized, pure iron powder Somaloy 500 along with 0.6% Kenolube by mass, has a statistical bending strength of at least 25 $N/mm^2$, determined on test rods according to ISO 3327, and a surface hardness HB 2.5/31.25 of at least 70.

In addition, on rings having an outer diameter of 40 mm, an inner diameter of 30 mm, and a height of 5 mm, a magnetic polarization $J_{100}$ of at least 1.4 Tesla at 100 A/cm, a saturation polarization $J_S$ of at least 1.5 Tesla at 500 A/cm, a maximum coercive field strength $H_{CB}$ of 3.0 Ampere/cm, a maximum permeability $\mu_{max}$ of at least 450, and a maximum total overall loss, $v_H+v_W$, of 8 W/kg at 1 Tesla and 50 Hz, are measured. In general, a saturation polarization of greater than 1.7 Tesla and a maximum permeability of approximately 500 are achievable in the case of a specific electrical resistance of approximately 10 μΩm.

The density of the obtained pressed parts is at least 7.30 $g/cm^3$. An increase in density to approximately 7.5 $g/cm^3$ is attainable by additionally postforming in a die tool or by subjecting the pressed parts to planar hot-forming.

What is claimed is:

1. A method for manufacturing a pressed part from a soft magnetic composite material, the method comprising:

providing a starting mixture including an iron powder and an auxiliary pressing agent;

pressing the starting mixture to form a pressed part;

annealing, in an annealing step, the pressed part in a gas mixture of inert gas and oxygen, a concentration of oxygen in the gas mixture being between 1% and 10% by volume;

prior to the annealing step, initially annealing the pressed parts at a temperature of 150° C. to 400° C. in one of air, an inert-gas atmosphere, and a mixture of an inert gas and oxygen in which an oxygen concentration in the gas mixture is between 1% and 10% by volume; and postforming the pressed parts.

2. The method of claim 1, wherein the pressed parts are initially annealed at a temperature of 230° C. to 310° C.

3. The method of claim 1, wherein the postforming includes one of pressing at a pressure between 600 MPa and 900 MPa and planar hot-forming.

4. The method of claim 3, wherein the pressing is performed at a pressure of between 700 MPa and 800 MPa.

5. A method for manufacturing a pressed part from a soft magnetic composite material, the method comprising:

providing a starting mixture including an iron powder and an auxiliary pressing agent;

pressing the starting mixture to form a pressed part; annealing the pressed part;

after the annealing, postforming the pressed part; and after the postforming re-annealing the pressed part, wherein:

at least one of the annealing and the re-annealing is performed in one of air, a nitrogen atmosphere, a noble-gas atmosphere, and a mixture of an inert gas and oxygen having an oxygen concentration of between 1% and 10% by volume; and the annealing and the re-annealing are performed in the gas mixture of the inert gas and oxygen, the oxygen concentration in the gas mixture being between 1% and 10% by volume.

* * * * *